United States Patent [19]

Smith

[11] Patent Number: 5,323,285

[45] Date of Patent: Jun. 21, 1994

[54] SHIELDED DUAL ELEMENT MAGNETORESISTIVE REPRODUCE HEAD EXHIBITING HIGH DENSITY SIGNAL AMPLIFICATION

[75] Inventor: Neil Smith, San Diego, Calif.

[73] Assignee: Eastman Kodak Company, Rochester, N.Y.

[21] Appl. No.: 902,619

[22] Filed: Jun. 23, 1992

[51] Int. Cl.⁵ .............................................. G11B 5/30
[52] U.S. Cl. .................... 360/113; 338/32 R
[58] Field of Search .......... 360/113; 342/252; 338/32 R; 29/609

[56] References Cited

U.S. PATENT DOCUMENTS

| | | | |
|---|---|---|---|
| 3,860,965 | 1/1975 | Voegeli . | |
| 4,052,748 | 10/1977 | Kuijk | 360/113 |
| 4,190,871 | 2/1980 | Walraven | 360/113 |
| 4,343,026 | 8/1982 | Griffith et al. | 338/32 R |
| 4,356,523 | 10/1984 | Yeh | 360/113 |
| 4,447,839 | 5/1984 | Desserre et al. | 360/113 |
| 4,589,041 | 5/1986 | Voegeli . | |
| 4,851,944 | 7/1989 | Mowry | 360/113 |
| 4,878,140 | 10/1989 | Gill et al. | 360/113 |
| 5,084,794 | 1/1992 | Smith . | |
| 5,140,267 | 8/1992 | Shintaku | 338/32 R |
| 5,155,643 | 10/1992 | Jones, Jr. et al. | 360/113 |
| 5,193,038 | 3/1993 | Smith | 338/32 R |
| 5,206,590 | 4/1993 | Dieny et al. | 338/32 R |

OTHER PUBLICATIONS

"Digital Magnetic Recording Theory," IEEE Trans. Magn., Potter, vol. MAG-10, pp. 502-508, (Sep. 1974).
"Magnetoresistive Transducers in High-Density Magnetic Recording," AIP Conf. Proc. (Magnetism and Magnetic Materials) 20, Thompson, pp. 528-583 (1974).
Smith et al., IEEE Trans. Magn. MAG-23, No. 5, p. 2494, (1987).
Smith et al., IEEE Trans. Magn. vol. 26, No. 5, p. 1689 (Sep. 1990).
Takano et al., IEEE Trans. Magn., vol. 27, No. 6, p. 4678 (Nov. 1991).

Primary Examiner—John T. Kwon
Attorney, Agent, or Firm—Daniel Robbins; William W. Holloway

[57] ABSTRACT

A shorted dual MR head which is magnetically shielded for the purpose of isolating the dual MR head from extraneous magnetic fields and from long wavelength recorded signals which could cause nonlinear distortion of the dual MR head but not shielded for the purpose of improving linear resolution. The magnetic shields do not significantly affect linear resolution of the dual MR head and can be spaced apart from the dual MR head over a wide range of separation distances limited by factors other than the characteristic bit length of the magnetic signal to be resolved. In one embodiment, at least one shielding element for the dual MR head can be one of the poles or other components of an inductive record head and, together, the two heads can form an integrated thin-film inductive record/MR reproduce head assembly.

21 Claims, 4 Drawing Sheets

SHIELDED DUAL ELEMENT MAGNETORESISTIVE REPRODUCE HEAD EXHIBITING HIGH DENSITY SIGNAL AMPLIFICATION

FIELD OF INVENTION

The present invention relates generally to a magnetoresistive reproduce head, and more particularly to a dual element magnetoresistive reproduce head.

DESCRIPTION RELATIVE TO THE PRIOR ART

A shorted dual element magnetoresistive (DMR) head is disclosed in U.S. Pat. No. 5,084,794 ('794), entitled "Shorted Dual Element Magnetoresistive Reproduce Head Exhibiting High Density Signal Amplification" issued Jan. 28, 1992 to the same inventor as this Application. Magnetic shielding for magnetoresistive (MR) heads has been described in: "Digital Magnetic Recording Theory," IEEE Trans. MAGN., Potter, Vol. Mag-10, pp. 502-508 (Sept., 1974) and "Magnetoresistive Transducers in High-Density Magnetic Recording," AIP Conf. Proc. (Magnetism and Magnetic Materials) 20, Thompson, pp. 528-533 (1974). Magnetic shielding disclosed in these references is described as a yoke of permalloy or other magnetically permeable material mounted with shielding faces parallel to the surfaces of the sensor element(s) (MR elements) of an MR head and spaced with an insulating layer providing a gap between the shielding elements and the MR elements.

It has long been known in the art that MR heads with magnetic shields arranged in such fashion provide several advantages over MR heads without such shields. Among these advantages are: isolation of the MR sensor from magnetic fields arising from external stray sources; protection against magnetic saturation due to the potentially large magnetic fields from long wavelength components of signals recorded in the medium; and improved thermal protection of the head by encapsulating the relatively delicate MR sensing structures in comparatively massive shielding structures with high thermal conductivity. Of even greater importance in conventional MR heads, magnetic shields arranged in the fashion described above improve linear resolution of the MR head, i.e., the ability of the MR head to resolve magnetic transitions on the magnetic tape or other media. The minimum length between recorded transitions in the magnetic media is commonly referred to as a "minimum bit length," and the linear resolution of an MR head is determined by the minimum bit length which can be reliably detected while distinguishing between adjacent bits.

Conventional MR heads increase linear resolution by using magnetic shielding structures to isolate the MR elements from magnetic fields associated with transitions approaching and/or receding from the MR elements until such time as each transition becomes located immediately below the MR elements and interior to the inside surfaces of the shielding material surrounding the MR elements. As stated in Potter, page 153: "The purpose of the shields is not to reduce electromagnetic interference from external sources; rather, it is to shield the MR stripe from the approaching transition until the last possible moment and thereby increase the resolving ability of the head." As further disclosed at Column 3, lines 47-52, in U.S. Pat. No. 3,860,965 entitled "Magnetoresistive Read Head Assembly Having Matched Elements for Common Mode Rejection" issued to O. Voegeli in 1973: "The spacing between shields...determines the minimum bit spacing allowable. As long as the bits are spaced at distances greater than the inside dimensions of the shield, only the bit under the MR elements is sensed by the elements." It follows that in order to maximize linear resolution, conventional MR heads are designed and fabricated to minimize the gap between the MR elements and the shielding structures such that the shield-to-sensor gap remains less than or equal to the "minimum bit length" expected to be resolved by the MR elements.

Unfortunately, as magnetic recording technology is driven toward higher linear densities, efforts to fabricate increasingly narrow gaps between shielding structures and MR elements require increasing complexity and precision of fabrication with associated higher processing costs together with lower yields of finished product. Additionally, the narrower the insulating gap between magnetic shield material and MR elements, the more likely that the integrity of the insulating gap will be broken by pinholes, smearing of either MR elements or shielding material across the insulating gap, as well as other adverse tribological conditions at the head-medium interface.

Because of the above limitations, a need has been felt for an MR head with good linear resolution which is easier to fabricate and which has a more reliable and more robust insulating gap between the shield elements and MR elements than conventional shielded MR heads.

SUMMARY OF THE INVENTION

It is an object of this invention to provide an improved DMR head.

It is a feature to provide an improved DMR head that overcomes the problems identified above with respect to fabrication, yield and reliability of narrow-gap shielded MR heads. This and other features of the present invention are achieved by combining a DMR head with magnetic shielding structures spaced with a gap between each shielding element and the MR elements, such gap being sized without regard to the linear resolution desired from the MR head. It has been discovered that when this design is utilized, high linear resolution is obtained independently by virtue of the dual element MR head. In addition, effective shielding against detection of extraneous magnetic fields and improved immunity to nonlinear distortion due to very long wavelength signals is obtained by the magnetic shielding structures. Thus, an MR head with high linear resolution, with improved immunity to extraneous magnetic fields, and with compatibility with an integrated inductive record/MR reproduce head structure can be manufactured in accordance with this invention with easier fabrication than conventional shielded MR heads of similar linear resolution, with higher yield and with greater reliability during use.

In the preferred embodiment, the DMR elements are surrounded by shielding elements (one on each side) with the shield-to-shield gap being substantially greater than two minimum bit lengths but less than the height of the MR elements.

BRIEF DESCRIPTION OF THE PREFERRED EMBODIMENT

Figure 1:
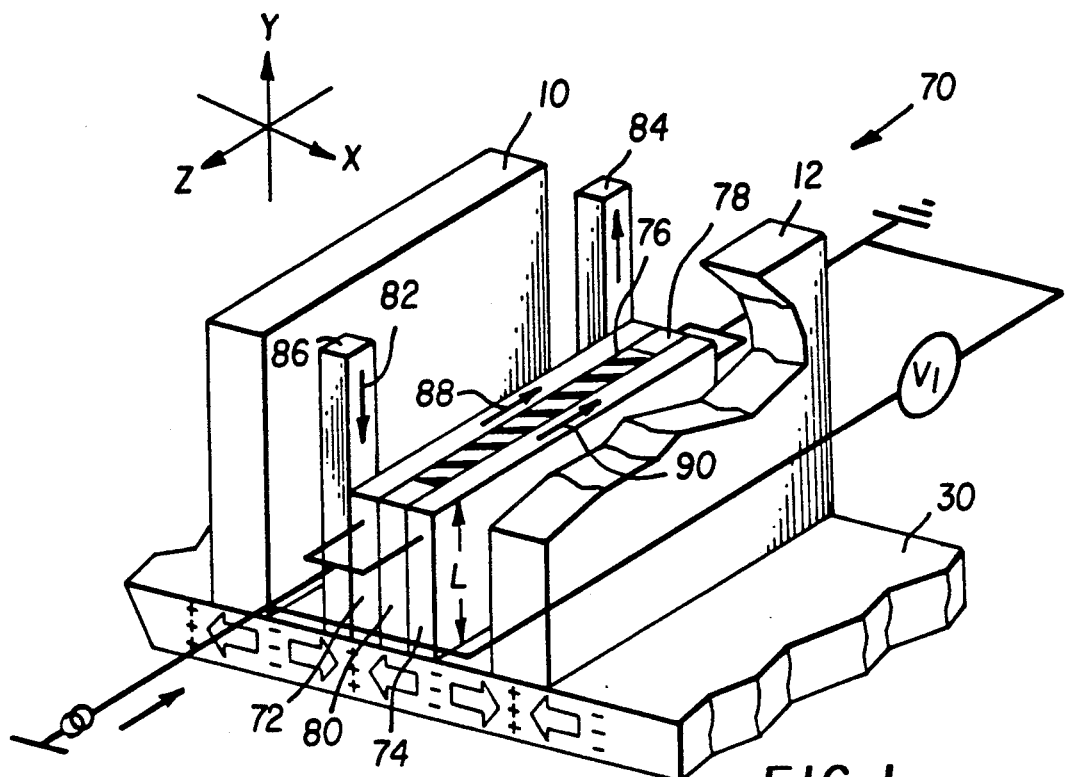
FIG. 1 is a partial cut-away schematic perspective view of a shielded shorted dual magnetoresistive head according to the present invention.
Figure 2A:
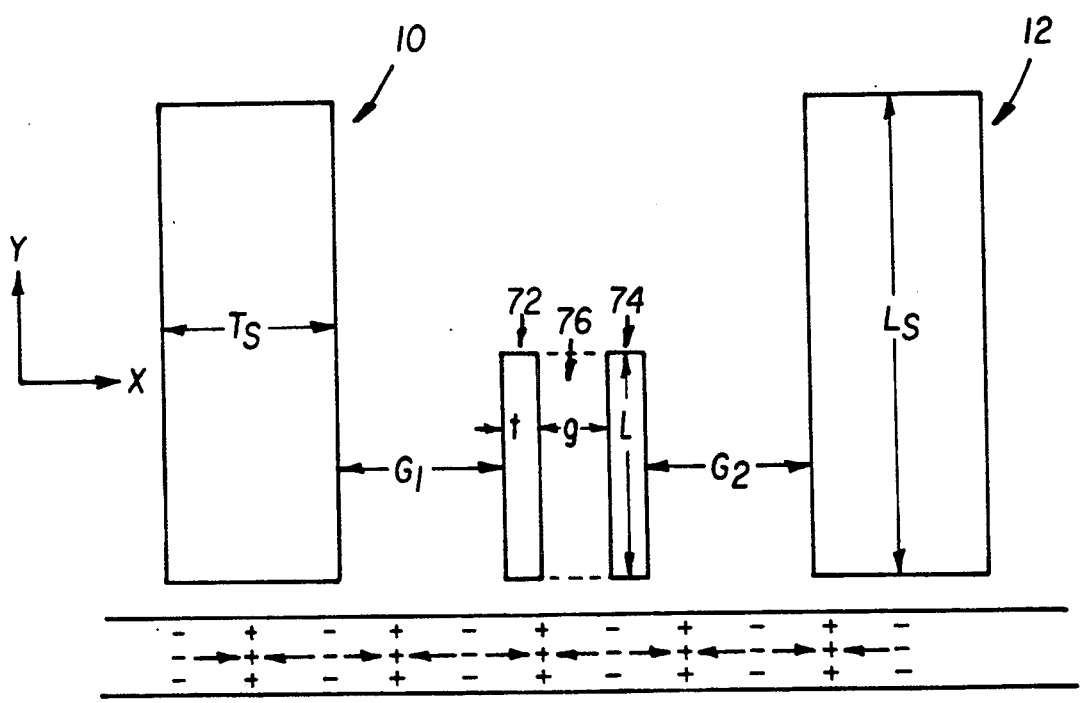
FIG. 2a is a schematic cross sectional view of the shielded shorted dual magnetoresistive head.
Figure 2B:
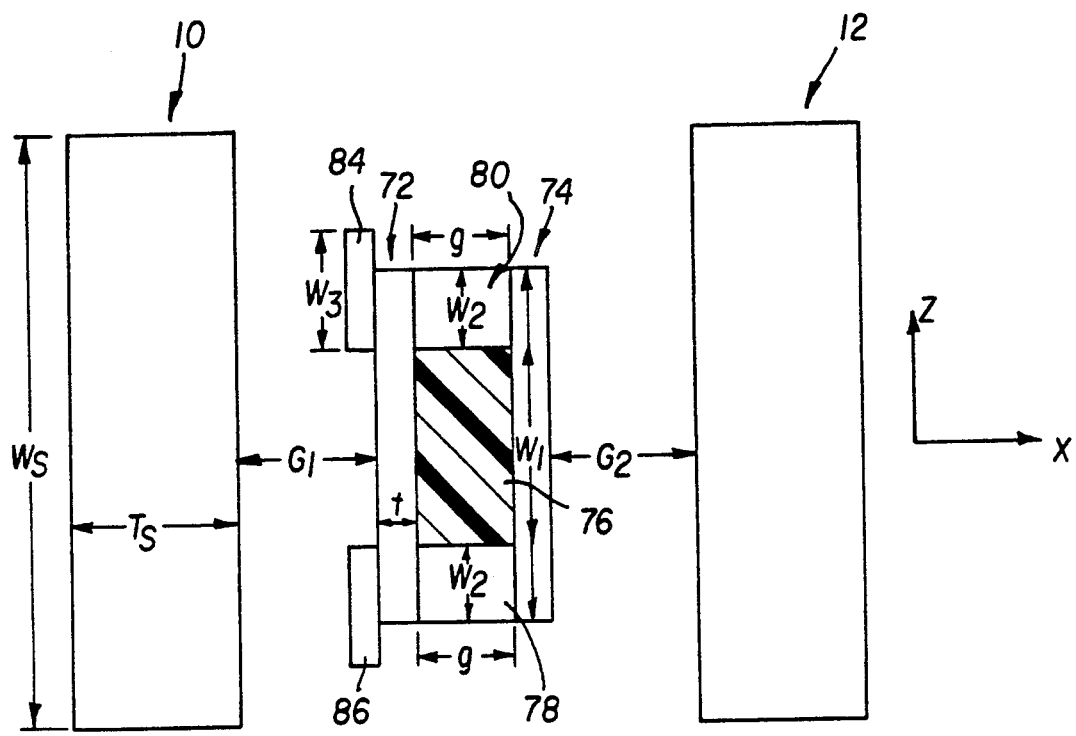
FIG. 2b is a schematic top-down view of the shielded shorted dual magnetoresistive head.
Figure 3:
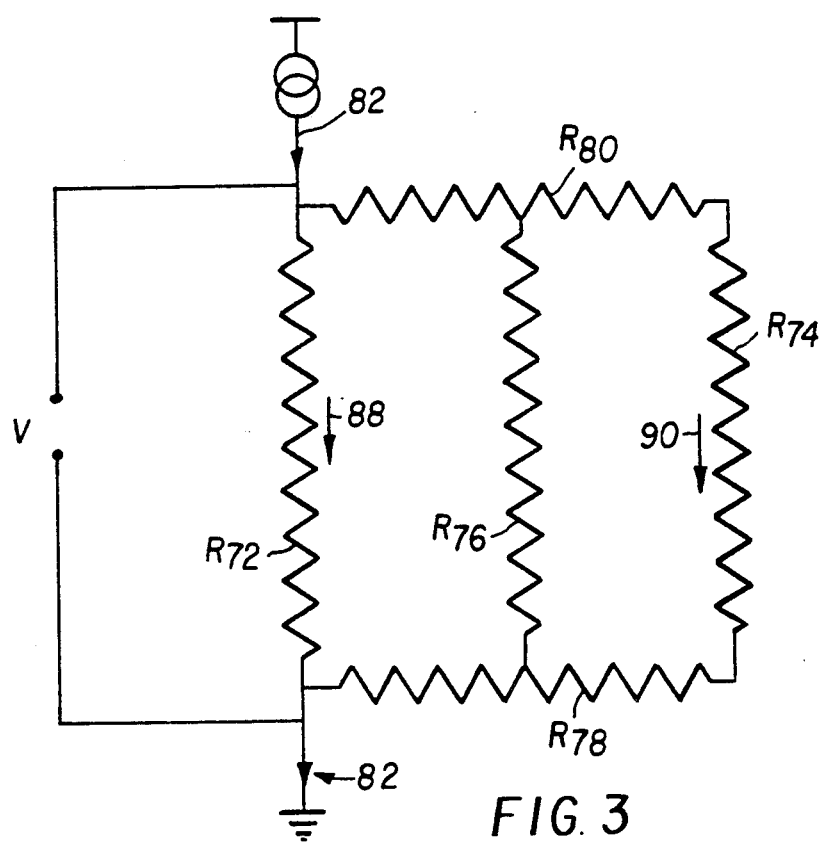
FIG. 3 is an equivalent circuit diagram of the shorted dual magnetoresistive head.

In accordance with the invention and referring to FIGS. 1, 2, or 3, the dual magnetoresistive (DMR) head 70 consists of two magnetically, electrically, and geometrically matched MR elements 72, 74 (made of electrically conductive, magnetically permeable, and magnetoresistive material such as Permalloy) separated over their entire lengths by a combination of nonmagnetic spacer 76 (made of material such as $SiO_2$) over their central region and by matched "shorting" stubs 78, 80 of conductive material (e.g. Au) at each end. (The circumstance of a conductive spacer 76 identical in composition to shorting stubs 78 and 80, which then form an essentially homogeneous spacer, 76,78,80 (e.g., Ti) is but a particular, easily fabricated special case of the more general structure indicate in FIGS. 1,2). A sense and biasing current 82 flowing to the head 70 via the leads 84,86 divides between the two MR elements 72,74. These currents 88,90 will be essentially equal because the MR elements 72,74 are nominally identical and because the shorting stubs, 78,80 electrically connect both MR elements 72,74 in parallel (see FIG. 3). Referring to cross-section view FIG. 2a and top-down view FIG. 2b, two shielding elements, 10 12, composed of suitably high magnetic permeability material (e.g., Permalloy), are positioned side-by-side to the two MR elements 72, 74 and are separated from them by spacers [not shown] composed of suitable electrically and magnetically insulating material (e.g., $SiO_2$ or $Al_2O_3$) of thicknesses $G_1$ and $G_2$.

Referring to FIG. 3, the equivalent electrical circuit of the DMR head 70 consists of a total current 82 flowing into parallel resistances $R_{72}$, $R_{74}$, and $R_{76}$, which are the resistances of MR elements 72 and 74, and spacer layer 76, respectively. The electrical potential (i.e., voltage of these film elements will by Ohm's law vary linearly along the current flow direction. By fabricating the electrically shorted condition across shorting stubs 78,80, the voltage will be essentially identical in all three layers, regardless of whether a small mismatch exits between MR elements 72,74 (likely to be unavoidable in practice), and regardless of the resistance $R_{76}$ of gap spacer 76, which may be chosen to be an electrically insulating layer. Because of the equality of voltage across all three layers, current flow in the DMR head will be unaltered due to any additional inadvertent electrical shorts (from similar sources as described earlier for the shielded MR head) between MR elements 72,74 and across an arbitrarily large resistivity gap spacer 76. As a result, the magnetic biasing and reproduce performance of the DMR head 70, which are functions of the sense currents 88,90, will be operationally immune to these types of shorts.

Referring again to FIG. 1, the DMR head is designed to predominantly sense the y-component of magnetic signal fields from the recorded magnetic medium 30. It is assumed that the non-biased quiescent magnetic state of the DMR head 70 is with both MR element magnetization vectors lying longitudinally along either ±z-axis. It is well known in the art that linear operation of any MR reproduce head requires establishing, through some means, a non-zero bias angle, $\theta b$, (preferably approximating 45°) representing the angle by which the magnetization vectors of the MR elements are rotated in the YZ plane (thereby having a y-component) in response to the bias means. This rotation of the magnetization in turn affects the electrical resistance of the MR head to a sense current flowing along the longitudinal, z-axis of the MR head. Since the y-component of magnetic signals from the recorded medium interact with the magnetization of the MR elements, such recorded magnetic signals cause the angle of the magnetization vectors, $\theta$, to modulate around $\theta_b$. Such modulation, $\delta\theta$, caused by the recorded signal fields in turn modulates the electrical resistance of the MR head which in turn causes the voltage of the sense current to modulate around its initial bias voltage, $V_b$. This modulation in sense current voltage, $\delta V$, forms the detectable signal by which the magnetic signal fields from the recorded medium are transduced into detectable electrical signals.

Figure 4:
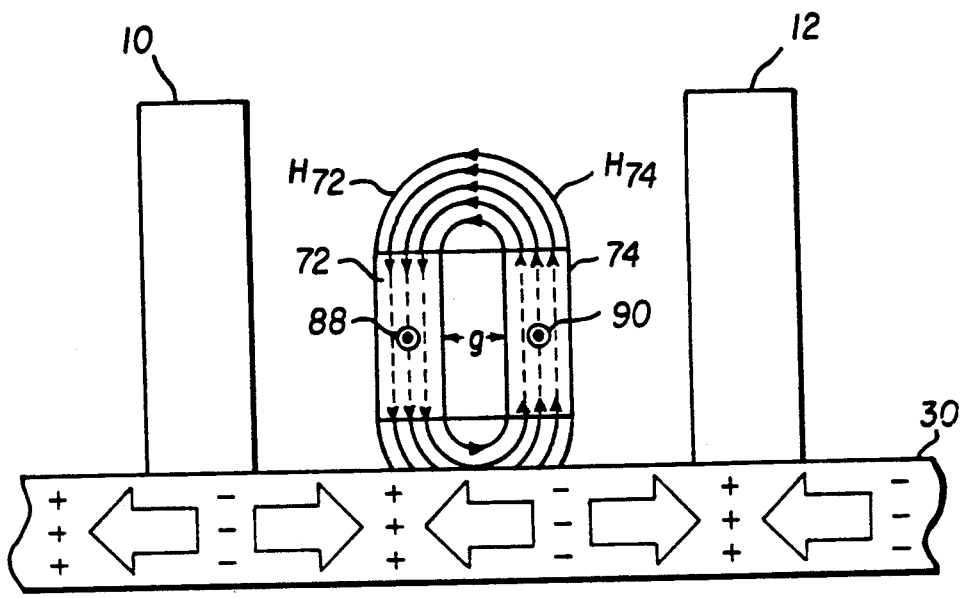
FIG. 4 is a diagram of dual magnetoresistive elements, magnetic shields, magnetic medium, and magnetic fields interacting between such magnetoresistive elements.

Referring to FIG. 4, it is well known in the art (Vogeli, U.S. Pat. No. 3,860,965 and Smith, U.S. Pat. No. 5,084,794) that DMR sense currents 88 and 90 flowing in elements 72 and 74, respectively, will generate y-axis magnetic fields $H_{72} = -H_{74}$ which are antisymmetric (i.e., equal in magnitude but opposite in direction) at the site of the adjacent MR elements 72,74 which in turn will induce approximately antisymmetric y-component magnetizations $M_{72} = -M_{74}$ in the MR elements. It is also well known in the art that these antisymmetric magnetization distributions will themselves produce fields at the adjacent MR element which are parallel to either $H_{72}$ or $H_{74}$ and which, in effect, greatly aid in amplifying the net bias magnetizations ($M_{b72} = -M_{b74}$) or net bias angles ($\theta_{b72} = -\theta_{b74}$) that are obtained for a given magnitude of sense current. This amplification, or "bootstrapping" (as it is referred to in Smith, U.S. Pat. No. 5,084,794), is a direct physical consequence of the relatively low magnetostatic energy of antisymmetric-magneto-statically-coupled films, as is the case for the close-proximity, adjacent DMR films 72 and 74. Because sense currents 88, 90 of the DMR head 70 simultaneously produce both the signal voltage, $\delta V$, as well as the proper bias angles $\theta_{b72}$ and $\theta_{b74}$ at practical sense current densities, the DMR head is "self-biased."

As was described pictorially by Smith, U.S. Pat. No. 5,084,794, the reproduce signal, $\delta V$, of a DMR head is proportional (to first order) to the difference ($\delta M_{72} - \delta M_{74}$) in magnetization modulation produced by the signal fields $\delta H_{72}$ and $\delta H_{74}$ from the recorded medium, at the site of the head-medium interface with elements 72 and 74, respectively. Any signal field distribution ($\delta H_{72}$, $\delta H_{74}$) may always be expressed as the superposition of the symmetric distribution ($\delta H_s$, $\delta H_s$) and antisymmetric distribution ($\delta H_a$, $-\delta H_a$) (where $\delta H_s=(\delta H_{72}+\delta H_{74})/2$, and $\delta H_a=(\delta H_{72}-\delta H_{74})/2$). These quantities in turn will produce either symmetric ($\delta M_{72}=\delta M_{74}$) or antisymmetric ($\delta M_{72}=-\delta M_{74}$) magnetization modulations. Since $\delta V$ is proportional to $\delta M_{72}-\delta M_{74}$, it follows that only the antisymmetric component of the signal field distribution will (to first order) produce a nonzero signal from a DMR head. For a given peak-to-peak amplitude signal field, the antisymmetric signal field component amplitude $\delta H_a$ will be a maximum when the bit length is approximately equal to the thickness, g, of spacer 76 between MR elements 72,74. Thus, the DMR spacer thickness g may be to some extent "tuned" to provide maximum reproduce sensitivity at a chosen recorded minimum bit length to be resolved.

Further, due to the amplification (or "bootstrapping") of any antisymmetrically induced modulation ($\delta M_{72}=-\delta M_{74}$) for the reasons discussed above, reproduce sensitivity of a DMR head to high density (minimum bit length of comparable size to gap thickness, g) recorded signals can be substantially greater than that of a geometrically similar, single-layer unshielded MR (UMR) head. Conversely, for low density recorded signals (minimum bit length $>>g$) the signal fields are predominantly symmetric in nature (i.e., $\delta H_{72} \approx \delta H_{72}$), and the DMR reproduce sensitivity to such low density recorded signals becomes substantially less than the unshielded MR head. This simultaneous enhancement of reproduce sensitivity at high linear densities and decreased sensitivity at low densities is fundamentally responsible for the increased linear resolution of the DMR.

The above response behavior is closely analogous to the functioning of a conventional shielded MR head in which the magnetic shields isolate the MR element from low density recorded signals (minimum bit length $>>$MR element-to-shield gap G) but interact with high density recorded signals (minimum bit length of comparable size to MR element-to-shield gap G) with the effect that such interaction by the shields with high density recorded signals actually increases the net $\delta H$ at the site of the MR element between the shields. Thus, in a conventional shielded MR head, linear resolution is most influenced by the distance of the MR element-to-shield gap, G, whereas in a DMR head, linear resolution is most influenced by the thickness, g, of spacer 76. However, unlike a conventional shielded MR head where operation of the head depends upon electrical isolation of the MR element from the shields, the DMR's immunity to electrical shorting puts no relevant technological restrictions on the thickness g of spacer 76. It follows that linear resolution of a conventional shielded MR head is limited in practice by the limits of fabrication and yield of MR element-to-shield gap G whereas, in a DMR head, the analogous spacer thickness g does not serve as a practical restriction on the minimum recorded bit length that may be successfully resolved.

As described above, the enhanced reproduce sensitivity to high density recorded signals and increased linear resolution of the DMR head is an intrinsic property of the DMR head design and is not directly affected by the presence of magnetic shields. Accordingly, the present invention teaches the addition of shielding structures to the DMR head to achieve other benefits unrelated to the enhancement of linear resolution. One primary benefit is the shielding of the DMR from extraneous, primarily uniform magnetic fields (e.g., from the actuator motor in a conventional disk-drive). In particular, shielding of a DMR head is effective against extraneous fields along the $\pm z$ direction, for which the DMR does not necessarily provide the symmetric (common) mode rejection as described above for uniform y-axis fields. Also, a shielded DMR may be incorporated in an integrated thin-film inductive record/MR reproduce head (as might be used in disk-drive applications), in which one of the shield structures may also serve as one pole of the thin-film record head. Provided the DMR-shield gaps $G_1$ and $G_2$ are large compared to the DMR spacer thickness g, the presence of the shields have little or no significant influence on the DMR reproduce sensitivity (as a function of recorded linear density).

Figure 5:
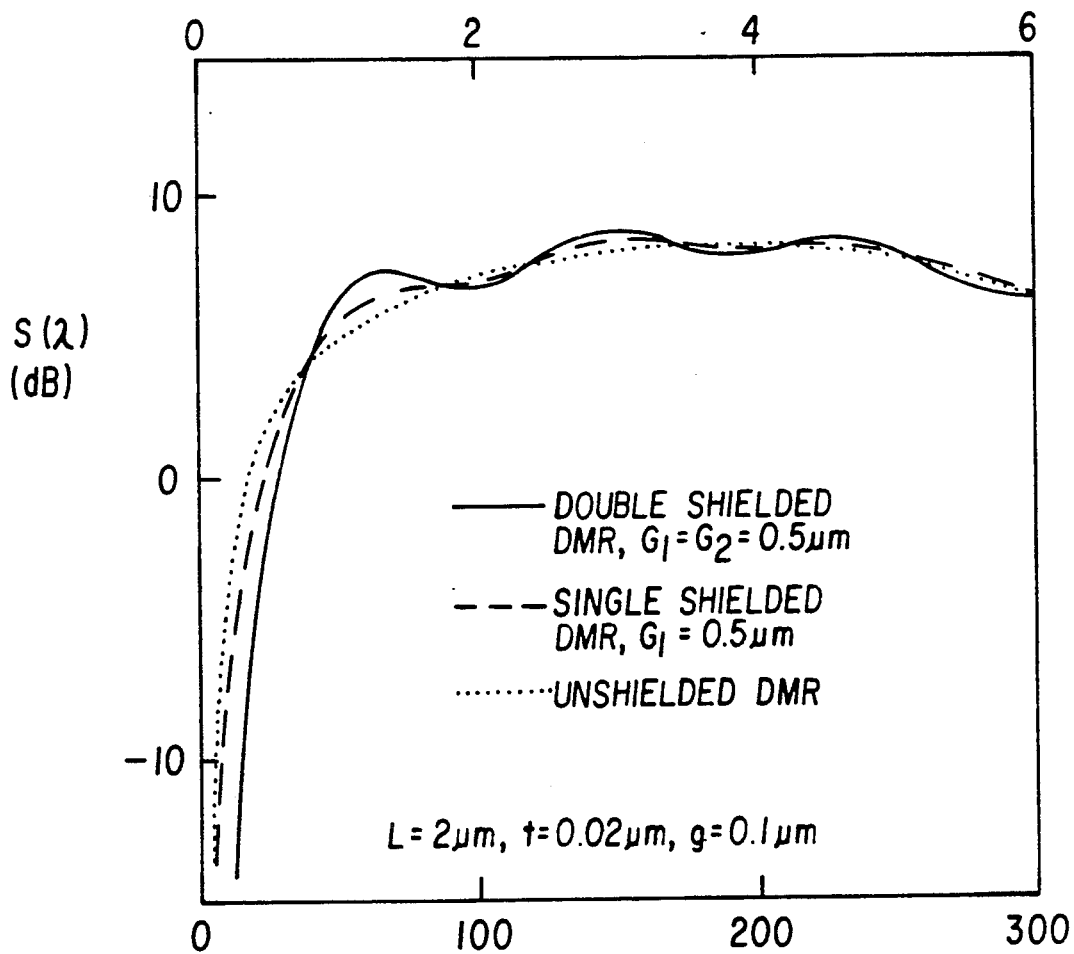
FIG. 5 is a plot of relative response levels of two shielded and an unshielded DMR head at recorded signal densities ranging from near 0 to 300 kilo-flux changes per inch.
Figure 6:
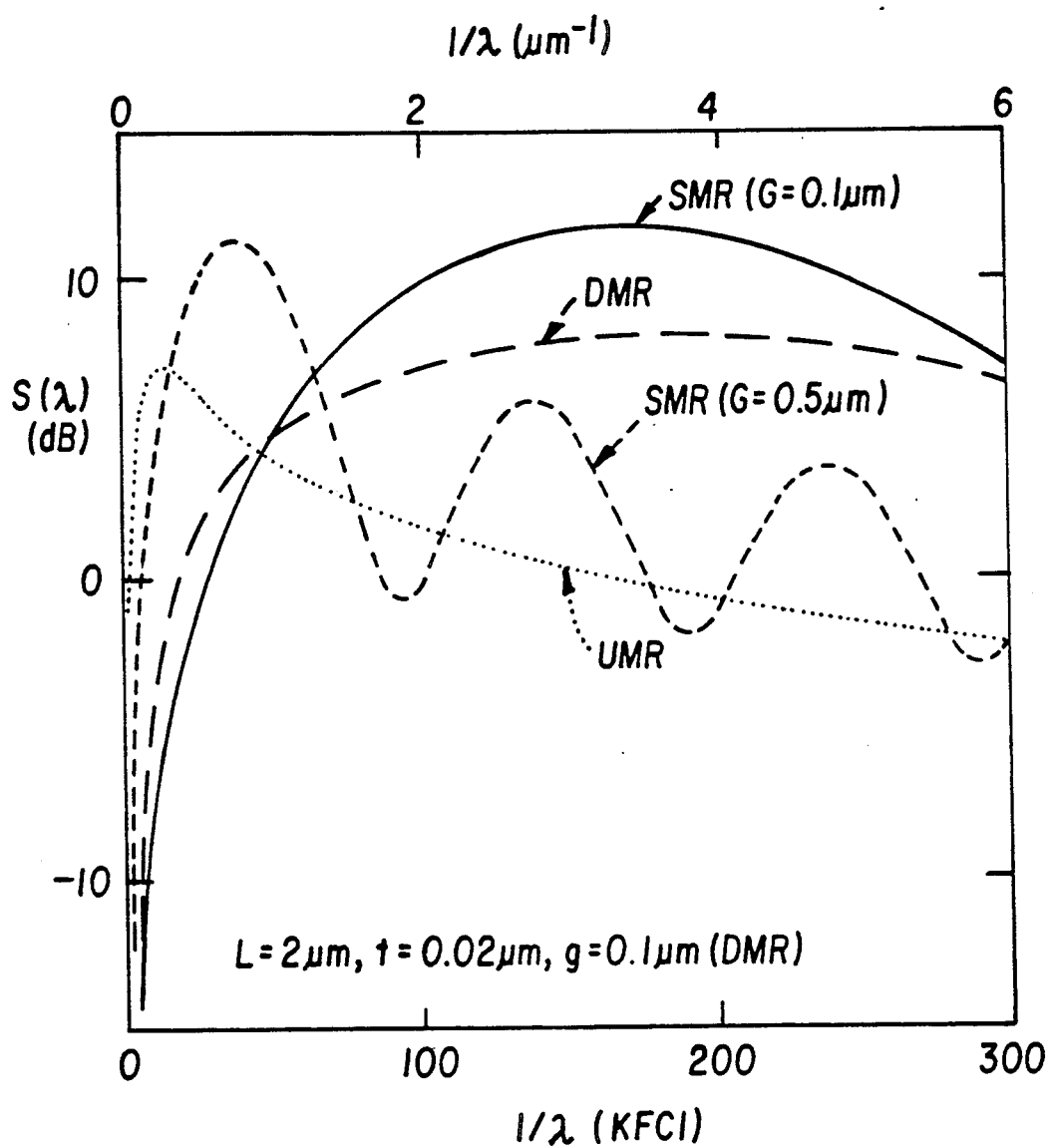
FIG. 6 is a plot of relative response levels of two shielded conventional MR heads, an unshielded conventional MR head, and an unshielded DMR head at recorded signal densities ranging from near 0 to 300 kilo-flux changes per inch.

FIGS. 5 and 6 show theoretical results for the relative intrinsic reproduce sensitivity $S(\lambda)$ versus recorded linear density $1/\lambda$ (where $\lambda$ represents the recorded wavelength which, in turn, is the equivalent of 2 bit lengths) for several specific types of MR heads, computed as described by Smith et al, IEEE Trans. Magn., MAG-23, 2494 (1987). $S(\lambda)$ is proportional to signal voltage $\delta V(\lambda)$ for reproduction of sinusoidally magnetized media. (Well known $\lambda$-dependent factors which are common to all heads, such as spacing loss, have been excluded). The computations are valid under the conditions that the recorded signal trackwidth on the magnetic medium is greater than the z-axis active track width, $W_1$-$W_2$, of MR elements 72,74 (FIG. 2b) and that MR element length, $W_1$, significantly exceeds the y-axis height, L, of MR elements 72,74 (FIGS. 2a, 2b). FIG. 5 shows $S(\lambda)$ for an unshielded, as well as a one and two-sided shielded DMR head with MR element height L=2 $\mu$m; MR element thickness t=0.02 $\mu$m; spacer thickness g=0.1 $\mu$m, and MR element-to-shield gap(s) $G_1=G_2=0.5$ $\mu$m (FIGS. 2a, 2b). The shielding structures are assumed large compared to the MR elements 72,74 (e.g., $T_s \geq 1$ $\mu$m, $L_s \geq 2$ times L, and $W_s > W_1$) [FIGS. 2a, 2b]. Assuming such largeness, the precise dimensions do not otherwise affect the results of FIGS. 5 and 6. The particular DMR design considered here would be appropriate for applications in which the recorded minimum bit length corresponds to linear recording densities between 100 and 200 kiloflux-changes-per-inch (KFCI). FIG. 5 illustrates that the sensitivity function $S(\lambda)$ for this DMR is not significantly affected by the presence of shielding structures having MR element-to-shield gaps, $G_1$, $G_2$, equal to 0.5 $\mu$m . Further, the influence of shields with $G_1$, $G_2$ gaps greater than 0.5 $\mu$m would be even less. In all cases, the maximum in the sensitivity function $S(\lambda)$ occurs when bit length $\lambda/2$ approximates spacer thickness g, in accordance with earlier descriptions.

FIG. 6 compares $S(\lambda)$ for an unshielded DMR, a conventional unshielded MR head (UMR), and two conventional shielded MR heads (SMR). In all cases, MR element height L=2 $\mu$m and MR element thickness t=0.02 $\mu$m. In the case of the DMR, spacer thickness g=0.1 $\mu$m. In one SMR example, the MR element-to-shield gap, G, equals 0.1 $\mu$m and in another SMR example, such gap, G, equals 0.5 $\mu$m. As shown in FIG. 6, an SMR head with a MR element-to-shield gap, G, equal to 0.1 $\mu$m achieves performance comparable to a DMR head with a spacer thickness g of 0.1 μm. Both of these SMR and DMR heads achieve comparable linear resolution and high density signal levels and similar decreased sensitivity to low linear densities. In practice, however, an SMR with a MR element-to-shield gap, G, equal to 0.1 μm is at or below current technological limitations for a shielded MR head (Tsang et al, IEEE Trans. Magn., 26, 1689 (1990), Takano et al, IEEE Trans. Magn. 27, 4678 (1991)), while a DMR head with spacer thickness g=0.1 μm is easily fabricated. By example, a more practical SMR head is one with a MR element-to-shield gap G equal to 0.5 μm. Its performance as shown in FIG. 6 is in stark contrast to the performance of the SMR head with G=0.1 μm, of the unshielded DMR head or of the shielded DMR head with comparable G=0.5 μm. Specifically, the performance of the practical SMR head with $G \geq 0.5$ μm shows substantial loss of performance for high linear densities exceeding 75-100 KFCI. Thus, for high density linear resolution, a DMR head offers a more practical and robust solution. As shown in FIG. 5 and unlike a SMR head, the presence or absence of magnetic shields does not significantly affect the linear resolution of a DMR head.

Regarding the shielding of the DMR from extraneous uniform fields and referring again to FIG. 2b, best shielding from z-axis fields will in general occur when at least one of the shielding structures satisfy the sufficiency condition that $G_1, G_2 < (W_s - W_1)$. Given the general flexibility in choosing shield width, $W_s$, for at least one shielding structure and because, as discussed above, performance of a DMR head is essentially unaffected by shields whenever $G_1$, $G_2$ greatly exceed spacer thickness g, a wide range of relatively large DMR element-to-shield gaps, $G_1, G_2$, may be successfully employed, regardless of how small the minimum bit length. This ability to greatly vary the MR element-to-shield gap, G, without diminishing reproduce sensitivity of the DMR is one of the important features of the current invention. When compared to conventional shielded MR heads which require MR elements-to-shield gaps, G, equal to or less than the minimum bit length, the ability to make such gaps much larger than such minimum bit length sharply reduces the probability of device failure and greatly ameliorates the previously described fabrication and yield problems of conventional SMR heads. Although DMR heads already offer intrinsic insensitivity to uniform y-axis fields, shielding from extraneous y-axis fields will be best when $G_1, G_2$ is less than the MR element height, L. This is in contrast to conventional SMR heads where such gaps, G, are determined by the much smaller minimum bit length of the recorded signal. Also, although the extinction of extraneous fields at the site of the MR elements 72,74 will in general be greatest for two-sided shielding structures, adequate shielding should still be achieved using single-sided shielding structures meeting the above geometrical criteria.

Another innovative feature of the shielded DMR relates to the method of providing magnetic bias to the MR elements. As is well-known under prior art, magnetic bias fields are applied in a conventional unshielded MR head either by placing the MR element within the magnetic field of a near-by (but non-adjacent) permanent magnet or by adding adjacent biasing layers (either soft magnetic layers or a current-shunt conducting layer) parallel and side-by-side to the MR element. In a conventional shielded MR head, the non-adjacent permanent magnet method cannot be used because the shields isolate the MR element from the magnetic field of the permanent magnet. A conventional shielded MR head thus can likely only be biased by adding adjacent biasing layers. These extra layers, however, increase fabrication complexity and also shunt sense current away from the active MR element, thereby reducing sensitivity by as much as 50 percent. In contrast, a DMR head is self-biasing, and, with a sufficiently large resistivity material comprising spacer 76, need not suffer any appreciable shunt loss. A shielded DMR thus adds protection against extraneous uniform fields without requiring additional internal biasing complexities. It follows that a shielded DMR provides good reproduce sensitivity without incurring appreciable shunt loss.

Finally, it is noted that, as suggested in the very low density portion of the curves shown on FIG. 5, the shielding structures for a DMR head tend to shield out signal fields for recorded wavelengths roughly greater than 6 times the MR element-to-shield gap, G (i.e. $\lambda > 6$ times $G_1$) at which point the signal fields become spatially uniform across the gap, G. It is well known in the art that the amplitude (averaged over MR element height L) of long wavelength (roughly $\lambda > L$) recording signal fields may be sufficiently large to cause substantial non-linear distortion in an unshielded MR head (the effects of which are not accounted for in FIGS. 5,6). The inclusion of shields for the DMR head therefore provides the additional benefit of reducing possible non-linear distortion and/or saturation for recorded wavelengths $\lambda > 6$ times $G_{1,2}$, particularly when $G_1, G_2 < L$. It follows from the above that a preferred maximum MR element-to-shield gap, G, should be less than 6 times the wavelength of a recorded signal which could be expected to cause non-linear distortion and/or saturation in the DMR head.

Features and advantages of the invention include the following:

An advantage of this invention is that less precision is required during the manufacture of the MR head since the gap between shields and MR sensor elements can be substantially greater than the narrow gap conventionally required between magnetic shielding elements and MR sensor elements. This decrease in design and fabrication precision allows cheaper manufacture and greater yield.

An additional advantage of the invention, when compared to conventional shielded MR heads, is the ability to avoid electrical shunt losses. Conventional shielded MR heads disclosed in the prior art for high-density applications use additional bias layers (soft adjacent or current shunt bias) inside the shields, adjacent to and shorted electrically to the MR element. The presence of these bias layers reduces the signal output by that fraction of current shunted through such bias layers, and such signal loss may be as large as 50%. In the preferred embodiment of the present invention, the sense current in the MR layers provides both signal and all necessary bias without any appreciable shunt losses.

An additional advantage of this invention is that the larger than normal gap permits use of thicker layers of insulating material between the shielding elements and MR sensor elements. This thicker insulating layer makes pinholes, cracks, and other defects in the insulating layer less likely during fabrication and during use. This results in higher yield during manufacture and more reliability during use.

A further advantage of this invention is that the thicker than normal insulating layer reduces the likelihood that an electrical short will result from smearing due to abrasion between the magnetic tape or other medium and the softer MR sensor or shielding element materials. Such shorts between shielding elements and MR sensor elements result in degradation or destruction of the ability of the MR head to transduce the signal being detected.

A further advantage of the invention is that a DMR head which is to be used for predictable characteristic bit lengths can be fabricated to maximize sensitivity of such DMR to such characteristic wavelengths without modifying the MR element-to-shield gap, G. This is done by adjusting spacer thickness g between the MR sensor elements.

A further advantage of this invention over an unshielded DMR is that it readily allows integration of the DMR head into an integrated thin-film inductive record/MR reproduce head structure such as could be used in a hard disk drive. Additionally, one of the poles in an inductive record head can also serve as a shield for the DMR head.

The invention has been described in detail with particular reference to preferred embodiments thereof, but it will be understood that variations and modifications can be effected within the spirit and scope of the invention.

I claim:

1. A magnetic head assembly for detecting magnetically recorded signals having a characteristic minimum bit length, said minimum bit length being the minimum distance between transitions recorded on a magnetic medium, said magnetic head assembly comprising:
    a) spaced apart at substantially said minimum bit length, shorted dual magnetoresistive elements;
    b) means for longitudinal concurrent current flow in said magnetoresistive elements, whereby said magnetoresistive elements mutually magnetically bias each other;
    c) means for generating detectable voltage changes in said magnetoresistive elements in response to magnetic signal fields from said magnetically recorded signals; and
    d) magnetic shield means for shielding said magnetoresistive elements from undesired magnetic fields.

2. The magnetic head claimed in claim 1, wherein said shield means is positioned generally side-by-side, parallel to, and spaced apart from said magnetoresistive elements by a distance greater than said characteristic minimum bit length.

3. The magnetic head claimed in claim 1, wherein said shield means comprises a pair of magnetic shield elements each located side-by-side and spaced apart from one of said magnetoresistive elements.

4. The magnetic head claimed in claim 3, wherein the distance between the near inside surfaces of said pair of magnetic shield elements is greater than twice said characteristic minimum bit length.

5. The magnetic head claimed in claim 1, wherein each said shield means is spaced apart from one said magnetoresistive elements by a distance less than the height of said magnetoresistive element.

6. The magnetic head assembly of claim 1, wherein each of said shield means is spaced apart from one said magnetoresistive element by a distance less than one-sixth times the bit length of recorded signals which are expected to induce non-linear distortion in said magnetoresistive elements.

7. The magnetic head claimed in claim 1, wherein the space between each said shield means and said magnetoresistive elements s occupied by electrically insulating material.

8. The magnetic head assembly of claim 1, wherein each said shield means has a long dimension and a short dimension which exceed the respective long and short dimensions of said magnetoresistive elements.

9. The magnetic assembly of claim 8, wherein said magnetoresistive elements are electrically shorted at both ends but not the middle of said long dimension of said magnetoresistive elements.

10. The magnetic head assembly of claim 8, wherein said shield means and said magnetoresistive elements are spaced apart by a distance less than the remainder determined by subtracting the length of said long dimension of said magnetoresistive elements from the length of said long dimension of said shield means.

11. The magnetic head assembly of claim 1, wherein said magnetoresistive elements are electrically shorted along substantially their entire length by an electrically conductive spacing means.

12. The magnetic head assembly of claim 1, wherein the distance between said magnetoresistive elements approximates the characteristic bit length of the recorded signal expected to be transduced.

13. The magnetic head assembly of claim 1, wherein said magnetic head assembly is located in proximity to a means for inductive recording and is aligned with said inductive recording means such that said magnetic head assembly can detect magnetically recorded signals on the same recording track on which said inductive recording means can record.

14. The magnetic head assembly of claim 13, wherein one component of said inductive recording means serves as at least an element of said shield means.

15. The magnetic head assembly of claim 1, wherein the distance between said magnetoresistive elements is filled with sufficiently resistive material such that substantially all of said concurrent current flow is through said magnetoresistive elements.

16. A method of fabricating a magnetic head assembly for detecting magnetically recorded signals having a characteristic minimum bit length, said minimum bit length being the minimum distance between transitions recorded on a magnetic medium, said method comprising:
    a) spacing apart at substantially said characteristic minimum bit length and shorting dual magnetoresistive elements;
    b) applying a longitudinal concurrent current flow in said magnetoresistive elements, whereby said magnetoresistive elements mutually magnetically bias each other;
    c) generating a voltage change in said magnetoresistive elements in response to magnetic signal fields from said magnetically recorded signals; and
    d) shielding said magnetoresistive elements from undesired magnetic fields.

17. The method claimed in claim 16, wherein said shielding step further includes the step of spacing apart a means for shielding from said magnetoresistive elements by a distance greater than said characteristic minimum bit length.

18. The method claimed in claim 16, wherein said shielding step further includes the step of locating a pair of magnetically shielding elements in a side-by-side and parallel arrangement each spaced apart from one of said magnetoresistive elements.

19. The method claimed in claim 18, wherein the shielding step includes the step of locating the pair of magnetically shielding elements with a distance between the near inside surfaces of said pair greater than twice said characteristic minimum bit length.

20.. A method of fabricating a magnetic head assembly for detecting magnetically recorded signals having a characteristic minimum bit length, said minimum bit length being the minimum distance between transitions recorded on a magnetic medium, said method comprising:

a) spacing apart at substantially said characteristic minimum length and shorting dual magnetoresistive elements;
b) fabricating the distance between said magnetoresistive elements such that said distance approximates the characteristic bit length of said recorded signal expected to be transduced;
c) applying longitudinal concurrent current flow in said magnetoresistive elements, whereby said magnetoresistive elements mutually magnetically bias each other; and
d) generating a voltage change in said magnetoresistive elements in response to magnetic signal fields from said magnetically recorded fields.

21. The method claimed in claim 20, further comprising the step of shielding said magnetoresistive elements from undesired magnetic signals.

* * * * *